United States Patent [19]

Fogel et al.

[11] 3,989,849
[45] Nov. 2, 1976

[54] IMPROVING THE FLAVOR OF DECAFFEINATED COFFEE BY RADIO FREQUENCY HEATING TO RAPIDLY DRY COFFEE BEANS

[75] Inventors: Harvey P. Fogel, Goshen; Irving Holzberg, Spring Valley, both of N.Y.

[73] Assignee: General Foods Corporation, White Plains, N.Y.

[22] Filed: Mar. 23, 1973

[21] Appl. No.: 344,395

[52] U.S. Cl. .............................. 426/242; 426/427; 426/428; 426/432; 426/460; 426/465; 426/467
[51] Int. Cl.² ........................................... A21D 6/00
[58] Field of Search ........... 426/427, 428, 241, 242, 426/466, 465, 467, 456, 459, 460, 432; 34/10

[56] References Cited
UNITED STATES PATENTS

| | | | |
|---|---|---|---|
| 1,016,294 | 2/1912 | Rosewater | 426/427 |
| 1,073,929 | 9/1913 | Rosewater | 426/427 |
| 1,640,648 | 8/1927 | Cross | 426/427 |
| 2,292,255 | 8/1942 | Weisberg | 426/242 |
| 2,307,710 | 1/1943 | Polin | 426/466 |
| 2,464,421 | 3/1949 | Torres | 426/242 |
| 2,601,067 | 6/1952 | Spenser | 219/10.55 |
| 2,746,865 | 5/1956 | Selzer | 426/242 |
| 3,063,848 | 11/1962 | Van Gelder | 426/242 |
| 3,121,635 | 2/1964 | Eldred | 426/242 |
| 3,122,439 | 2/1964 | MacAllister | 426/467 |
| 3,528,179 | 9/1970 | Smith | 34/10 |
| 3,595,668 | 7/1971 | Nutting | 426/467 |
| 3,597,240 | 8/1971 | Foltz | 426/242 |
| 3,669,679 | 6/1972 | Panzer | 426/428 |

Primary Examiner—Norman Yudkoff
Assistant Examiner—Martin G. Mullen
Attorney, Agent, or Firm—Bruno P. Struzzi; Daniel J. Donovan; Doris M. Bennett

[57] ABSTRACT

Improved flavor of commercially decaffeinated coffee is accomplished by rapidly drying the wet decaffeinated beans with radio frequency heating the thermal and radio frequency energies required and the wavelength and duration of exposure to the same being sufficient to impart a porous structure to the bean without rupturing the same.

13 Claims, No Drawings

IMPROVING THE FLAVOR OF DECAFFEINATED COFFEE BY RADIO FREQUENCY HEATING TO RAPIDLY DRY COFFEE BEANS

BACKGROUND OF THE INVENTION

This invention relates to a novel use of electromagnetic energy in coffee technology. In particular, this invention pertains to the drying of decaffeinated green coffee beans utilizing electromagnetic energy within the frequency range commonly referred to as radio frequency heating. The use of this technology with decaffeinated green coffee beans has not only been found to effect a more rapid and uniform drying of the coffee bean but more importantly, results in a decaffeinated coffee product of improved flavor quality.

Heretofore, it has commonly been the practice to use various methods of air drying for drying decaffeinated coffee beans. Generally, the operating conditions common to the majority of such methods involves heating the air and passage of the same through a bed of coffee. Since coffee is granular, whether natural or washed, minimal resistance is offered to the passage of air, yet there is a sufficient amount of resistance to insure adequate heat and moisture exchange between air and coffee as well as even distribution of air flow to all parts of the bed. The method of through-circulation drying has been in the past, far more efficient as to heat and moisture exchange than merely passing the air over the surface of the coffee beans. For this reason, the coffee beans are usually kept in motion in order to effect more even drying.

A commonly used apparatus which functions to cause more uniform drying of the coffee bean is the Roto-louver dryer which, while drying the beans by air flow through louvers in the walls of the cylindrically-shaped apparatus, constantly mixes the beans by its rotary operation (*Chemical Engineer's Handbook*, John H. Perry, ed., McGraw-Hill Book Co., Inc., 1950, p. 825).

The vertical turbodryer is an additional type of dryer used in the coffee industry and demonstrates a procedure similar to the Roto-louver dryer. However, the vertical turbodryer, a type of continuous tray dryer, accomplishes a purportedly uniform drying by utilizing vertically arranged trays over which separate and continuous air flow is directed. The coffee beans are fed into the top tray and systematically introduced to progressively lower levels where further reduction of moisture content is achieved (*Chemical Engineering Handbook*, John H. Perry, ed., McGraw-Hill Book Co., Inc., 1950, p. 822).

As is evident from the discussion concerning conventional drying methods and the equipment available to accomplish the same, the current procedures involve refined equipment and extensive use of time and manpower in order to accomplish adequate drying of the bean. In addition, in utilizing the conventional drying methods the full flavor potential of the dried beans has not been realized as is evident from the improved flavor quality of the product of this invention.

The potentialities of the moderate frequency microwave type of electromagnetic energy for use in the heating and cooking of foods have been known for almost three decades but such technology as applied to the food industry for food processing and development is a relatively new innovation due to the previous unavailability of large-scale industrial apparatus.

Currently, electromagnetic energy of microwave wavelengths is being applied throughout the food industry for cooking, puffing of dry products such as fruits, thawing of meats and baked goods, and for drying of blanched products such as almonds where rapid removal of excess moisture is effected without adversely overheating the nut (*An Introduction to the Industrial Applications of Microwave Energy*, Varian/Industrial Microwave Operation, Palo Alto, California, July 1968, p. 28).

More recently it was found that the combination of microwave technology and the use of other type of drying processes such as the fluidized-bed were useful for drying such products as grains, vegetables, berries and the like (U.S. Pat. No. 3,528,179 issued Sept. 15, 1970), Ideally, a method of drying decaffeinated coffee beans which not only accomplished a far more rapid and uniform drying of the bean, and eliminated the problem of combustion of the residual chaff and the like, but which at the same time produced a product with significantly improved flavor would be beneficial to both the industry and consumer at large. This invention affords a method of producing such a product by utilizing radio frequency heating to dry decaffeinated coffee beans.

SUMMARY OF THE INVENTION

Natural coffee flavor is modified and some of the peak flavor notes are lost in the decaffeinated coffee product. It has been found that the flavor of such coffee can be significantly improved by drying the bean at least in part by means of radio frequency heating, appreciably higher frequencies being undesirable due to their inability to penetrate the coffee bean and thus effect complete and uniform drying. In addition, the use of radio frequency heating, especially microwave heating, has proved to be more desirable with respect to the significant reduction in drying time afforded by this method.

Water being a polar molecule, is particularly attractive to a rapidly reversing electric field and in the case of coffee this takes on a twofold significance; (a) the molecular dipole movement of the water generates heat within the bean rather than being forced into the bean from an external heat source, thereby preventing hardening of the bean casing, and (b) a greater concentration of energy in the wetter areas of the bean results, thereby affording a more uniform drying of the same and elimination of the problem of overheating. Such a method of internal heat generation is useful where excess solvent is present following solvent as opposed to water extraction, for by increasing the pressure within the bean due to the increased vibration of the polar molecules and the consequent rise in temperature, the excess solvent present may be brought to its vaporization point and the vapor blown off using conventional methods.

The significant improvement in flavor of the decaffeinated coffee having undergone radio frequency heating was completely unexpected but it is postulated that the flavor improvement is due to the porous structure of the coffee bean having undergone this type of rapid drying. It is probable that the structural modification was due to exposure of the coffee bean to the rapidly alternating electric field resulting in the evaporation of the solvent within the bean occurring at a higher rate than the solvent could diffuse out to the surface, thereby causing expansion of the bean. Such rapid drying also eliminates the need for the escaping water to overcome resistance to the hardened bean casing in the air drying process, thereby eliminating the tendency of the bean to be "cooked" while air dried which tends to forsake flavor potential. The invention is predicated upon the discovery of the flavor improvement of the electromagnetically dried bean.

Accordingly, the present invention is intended to provide a decaffeinated coffee product with improved flavor.

Another object of this invention is to provide a more rapid means of drying decaffeinated green coffee beans whereby the problems of combustion of accumulated chaff, non-uniform drying and combinations thereof are eliminated.

The above and additional objects of this invention are accomplished by treating wet decaffeinated beans at least in part, with electromagnetic energy of the radio frequency type, for a period of time sufficient to render a thoroughly dried, uniformly dried coffee of superior flavor quality.

DESCRIPTION OF THE INVENTION

The present invention contemplates the use of radio frequency heating for drying decaffeinated coffee beans. Although those wavelengths comprehended within this range of electromagnetic radiation are sufficient to accomplish the purpose for which they are herein incorporated, a majority of the references made to the use of this technology as applied to coffee will be directed to wavelengths of the microwave type in the following treatise of the invention.

To effect drying of the green decaffeinated coffee beans using radio frequency heating several methods of drying may be employed such as intermittent applications of various radio frequency wavelengths, or combinations of radio frequency heating with other drying techniques such as air drying, vacuum drying, freeze-drying and the like, being applied either concurrently or sequentially therewith. For example, the green beans may undergo a pre-drying step such as air drying to a moisture level of about 20% or preferably may undergo high velocity air drying which may or may not take the form of a fluidized bed during application of radio frequency heating. The latter method is particularly useful where organic solvent extraction has been employed for the electromagnetic energy causes the temperature to increase to a point where the solvent is vaporized. The concurrent use of the fluidized bed having a high velocity air flow allows the vapor to be blown off immediately as it diffuses out of the bean.

The actual amount of energy required to dry the beans is determined by the quantity of moisture to be evaporated i.e. the initial and final moistures, the quantity of beans being dried, the initial temperature of the beans, the amount of heat supplied by air circulating through the coffee beans and the inefficiencies of the process. For example, the energy theoretically required to reduce the moisture from 55% to 10% on a wet bean basis for beans originally at 80° F is about 10 kw-min. per pound of wet beans, based on the heat capacity of the beans and the latent heat of vaporization of water. Generally speaking therefore, the theoretical energy required is the sensible heat plus the latent heat of vaporization. If these beans are to be dried by microwave energy alone the power required for the process is the theoretical energy per pound multiplied by the feed rate divided by the efficiency of energy utilization, for example, 10 kw-min. per pounds times 100 pounds per minute divided by 0.5 efficiency equals 2000 kw. This might be accomplished with one 2000 kw unit, 2–1000 kw units, 3-667 kw units, 4-500 units etc. depending upon other design criteria not critical for this invention. Also, with improved efficiency such as 0.75 resulting from circulating dry air or improved unit design the total microwave power required for the same quantity of beans would be reduced to 1333 kw. Doubling the product rate would double the power required.

If hot air is circulated through the coffee beans the amount of microwave energy required decreases as more drying is accomplished by the air. For example if 2000 kw power is used to dry 100 pounds of wet beans per minute with microwaves in a low velocity 80° F air atmosphere, then the same drying rate may be accomplished with 600 kw microwave power is an atmosphere of high velocity 250° F air. Thus, much of the drying is done by the hot air in this case.

Thus it can be seen that a commercial production installation for drying coffee beans according to this invention could conceivably take on an infinite number of configurations.

The limits of design would fall within the following values for practical applications; minimum air temperature of about 70° F since lower temperatures would remove heat from the beans to such an extent that drying times would become impractically long, efficiency would become unnecessarily low, and cost would increases; maximum air temperature would be about 360° F as higher temperatures would cause roasting, preferred temperatures for air being about 200 to about 300° F which gives a good balance between drying time, energy required to heat and circulate the air, efficiency, and cost, Microwave energy input could range from as high as 40 kw-min. per pound of water removed to as low as 2.0 kw-min. per pound of water removed depending upon the efficiency of the process, the lower ranges of power output being preferred for reasons of cost.

The time required to produce dried beans depends on the rate of energy input from microwave and hot air. The fastest time is limited by the rate in which microwave energy can be applied without rupturing the beans due to rapid vaporization which is usually no shorter than 2 minutes. The slowest time would be on the order of about 90 minutes for economy of equipment size but longer times are possible, the preferred range of the time being from about 5 to about 50 minutes.

In the case of dielectric heating, it is preferred that the beans not come in contact with the heating plates and for this reason, suspending the beans between the electrodes in a non-metallic apparatus capable of tumbling the beans for uniform drying is recommended.

Summarly, the kilowatt power utilized is dependent upon the intensity of the heating effect and the consequent rapidity of the drying process desired which is in this case, usually not less than 2 minutes. Similarly, it is not wished to limit this invention by restricting it is only those frequencies currently utilized within the industry but rather, is intended to comprehend those frequencies within the radio frequency heating range.

Accordingly, the green coffee beans may be decaffeinated by solvent extraction utilizing either water or an organic solvent. Water extraction procedures as demonstrated in U.S. Pat. No. 2,309,092 issured Jan.

26, 1943 usually involves extracting dry green coffee by the passage of a substantially caffeine free water solution of green solids at about 200° F through a series of columns containing the caffeine-laden beans. The hot water solution has an affinity for caffeine and continuously reduces the same from the bean as the water passes through the column. Aqueous extraction methods require subsequent passage of the aqueous green extract through an extraction column containing an organic solvent such as trichloroethylene which functions to remove the caffeine from the water extract containing the coffee solids. The water extract is then stripped of solvent and reused to extract more green coffee. Such methods remove about 98% of the caffeine and yield wet decaffeinated beans having a moisture content of about 30% to about 70%.

This invention is also useful for drying solvent decaffeinated coffee produced by processes similar to those taught by U.S. Pat. No. 2,309,092 issued Jan. 26, 1943 or U.S. Pat. Nos. 3,700,464 and 3,700,465 issued Oct. 24, 1972. These processes usually involve a presteaming step to wet the dry green beans to 15% – 70% moisture followed by direct contact extraction with a caffeine-loving organic solvent such as methylene chloride, trichloroethylene, monochlorodifloroethylene (Freon 21) the like. The solvent is removed and the beans are stripped of residual solvent by conventional means such as steam contact, moist air, vacuum treatment or the like. Generally, direct steam contact is employed to remove the residual solvent. The solvent-free beans generally have a moisture content of 15% – 70% after steaming and are usually dried to a stable condition.

The beans by either water or organic solvent processing are dried using radio frequency heating at least in part, having a power output determined by the rapidity of the drying process desired in conjunction with the amount of beans and the moisture content thereof, emitting a frequency of usually about 915 $MH_2$ or 2,450 MHz in the case of microwaves. However, this invention is not circumscribed by these frequencies alone.

As a result, without effecting any contact with the bean whatsoever, the application of latent heat causes the water to evaporate or in the case of solvent extraction, produces heat sufficient to cause vaporization of the solvent. This vapor can subsequently or concurrently be removed by high velocity random air flow such as is rendered by the use of the fluidized bed or similar such techniques.

In comparison to the minimum of 3 – 5 hours required for air drying alone at temperatures of about 350° F or higher in the standard process and the comparatively shorter period of 45 minutes required for the fluidized bed type of drying, drying the decaffeinated beans to a moisture content of about 10% can be accomplished in about 5 minutes if desired. By combining microwave heating with a high velocity air drying method, preferably in a fluidized bed, the drying time is shortened due to the inductive type of heating effected by the microwave, thereby driving the solvent from the inside of the bean out to the surface thereof where virtually instantaneous drying is achieved on contact with the gas flow.

Comparative studies were conducted to determine whether or not the improved flavor of the microwave-dried bean was due to the rapidity of the drying process and/or to the elimination of prolonged drying at increased temperatures. Accordingly, decaffeinated beans were freeze-dried under significantly reduced temperature factors which necessitated drying times of between 12 to 24 hours. In addition, samples of decaffeinated beans were subjected to the fluidized-bed type of drying process under conditions ranging from 400° F for about 6 minutes to a drying time of 40 minutes at 200° F. All samples, including the microwave-dried sample were dried to equivalent levels of moisture content. When correspondingly roasted to their optima, the microwave-dried product was superior in flavor to all samples tested.

The salient point of this invention, therefore, is not necessarily the application of radio frequency heating preferably via microwaves, to decaffeinated coffee beans so as to effect a more rapid and uniform drying of the bean, but rather, the significant improvement in flavor which results as compared to conventionally dried beans.

In order that the present invention be more clearly understood, reference will now be made to the following examples directed mainly to the preparation and use of the preferred embodiment of this invention.

EXAMPLE I

Two blends of decaffeinated coffee beans were each dried by three different methods, roasted and ground, percolated in a drip pot and evaluated by a trained panel of tasters.

First, a batch of wet, decaffeinated, green coffee beans having a moisture content of about 50% was obtained, said batch being divided into 3 equal parts and dried using 3 different methods:

1. Rotating in a 350° F hot air stream for 3 – 5 hours as representative of a typical air drying procedure.
2. Freeze-dried for about 14 hours.
3. Microwave dried using the following procedure:
   a. A nine-sixteenth inch thick by eight inches wide layer of wet beans is continuously loaded onto a teflon coated fiberglass mesh belt conveyorized microwave unit.
   b. The microwave unit is set to operate at 2450 MHz frequency having an overall power output of up to 10 kilowatts.
   c. The 22 ft. long conveyorized microwave belt has a microwave radiation contact measurement of 10 ft., the remaining 12 ft. being comprised of loading and unloading sections and chambers to prevent escape of radiation out of the unit.
   d. The belt speed is set for 2.5 minutes per foot resulting in a residence time in the 10 foot heating chamber of 25 minutes, the power level being adjusted to a full 10 kilowatt output.
   e. Product is collected and moisture level determined.

The typically air-dried beans and the freeze-dried and microwave-dried beans were roasted, ground, and brewed for evaluation by a panel of trained tasters whose consensus was a preference for the microwave-dried coffee. This experiment was repeated with a batch of another blend of decaffeinated coffee and panel evaluation and preference was the same.

It is believed that this improved flavor is a result of the microwave processing itself and not as a result of less severe drying conditions as illustrated by the fact that the microwave dried product was superior to that which was freezedried.

EXAMPLE II

A batch of wet decaffeinated beans having a moisture content of 54% was obtained and samples of the same dried using the following methods:
1. Air dried in a fluid bed dryer with upward air flow through the bed of coffee beans sufficient to give good mixing for 54 minutes at 200° F, 16 minutes at 300° F and 6.5 minutes at 400° F. These beans had a final moisture content of about 10%.
2. Air dried by a typical method of rotating in a 350° F hot air stream for 3 – 5 hours.
3. Microwave-dried in a conveyorized microwave oven at a power level of 10 kilowatts, 2450 MHz for 25 minutes.

The fluid bed-dried, typically air-dried and microwavedried beans were roasted, ground and brewed for evaluation by a panel of trained tasters. Consensus was that there was very little difference between the fluid bed-dried and typically air dried samples but that the microwave-dried sample had a different and improved flavor.

EXAMPLE III

It was found experimentally that it is possible to retain the improved microwave-dried flavor while reducing the cost of the process by drying with a combined fluid bed-microwave drying process.

Three pounds of wet beans at 52% initial moisture were placed into a 4 inches diameter glass pipe installed vertically in a batch type microwave unit operating at 2450 MHz with a maximum power output of 2 kilowatts.

Sufficient air at 250° F to fluidize the beans was directed through the pipe. Simultaneously, a power level of 1 kilowatt was applied to the batch unit. After 24 minutes, the moisture was reduced to about 8% and the beans were removed.

The beans were then roasted in the conventional manner, ground and brewed for organoleptic evaluation. Flavor improvement characteristic of microwave drying was perceived.

EXAMPLE IV

Decaffeinated green coffee beans having an initial moisture content of 52% were dried to a 10% final moisture content in a dielectric unit with maximum output of 5 kw, operating at 70 MHz as follows:

3 pounds of wet beans were placed in a non-metallic rotating basket positioned between the electrodes to afford tumbling of the beans and consequently to improve the uniformity of the heating.

An energy rate of about 1.3 kw was applied for 50 minutes. The resulting dried beans were roasted, ground and brewed for evaluation by a panel of expert tasters. Consensus opinion favored the dielectrically-dried beans as compared to a typically air-dried control. The flavor of the dielectrically-dried bean brew was similar in character to previous microwave dried samples.

What is claimed is:

1. A process for improving the flavor of decaffeinated coffee comprising decaffeinating the green coffee beans and drying the beans by the application of radio frequency heating, for a period of time of about 2 to about 90 minutes at temperatures of about 70° F to about 360° F, the radio frequeny energy required being about 2 to about 40 kw minutes per pound of water removed, the thermal and radio frequency energies required, and the wavelength and duration of exposure to the same being sufficient to impart a porous structure to the bean without rupturing the same such that an improved flavor quality is demonstrated in the decaffeinated coffee product when roasted.

2. The process as recited in claim 1 wherein the decaffeinated green coffee beans are dried utilizing a frequency within the microwave frequency range.

3. The process as recited in claim 2 wherein the decaffeinated green coffee beans are dried for a period of time of about 5 to about 50 minutes at temperatures of about 200° F to about 300° F.

4. The process as recited in claim 2 wherein the microwave frequency is 2450 MHz.

5. The process as recited in claim 1 wherein the microwave frequency is about 915 MHz.

6. The process as recited in claim 3 wherein the decaffeinated green coffee beans are dried solely by the use of microwave frequencies.

7. The process as recited in claim 6 wherein a plurality of frequencies are intermittently applied.

8. The process as recited in claim 2 wherein microwaves are applied concurrently with other drying methods.

9. The process as recited in claim 8 wherein the decaffeinated green coffee beans are dried concurrently with a high velocity air drying method.

10. The process as recited in claim 9 wherein the air drying method is a fluidized bed.

11. The process as recited in claim 2 wherein the microwaves are applied sequentially with other drying methods.

12. The process as recited in claim 2 wherein the green beans are decaffeinated using a substantially caffeine-free aqueous solution of green coffee solids.

13. The process as recited in claim 3 wherein the green beans are decaffeinated using a caffeine-loving organic solvent.

* * * * *

UNITED STATES PATENT AND TRADEMARK OFFICE
CERTIFICATE OF CORRECTION

PATENT NO. : 3,989,849

DATED : November 2, 1976

INVENTOR(S) : Harvey P. Fogel et al.

It is certified that error appears in the above-identified patent and that said Letters Patent are hereby corrected as shown below:

On the cover page, second line of title, before "RADIO" insert -- APPLYING -- .

In column 1, second line of title, before "RADIO" insert -- APPLYING -- ; line 59, change "beans" to -- bean -- .

In column 2, line 12, change "type" to -- types -- .

In column 4, line 2, change "pounds" (first occurrence) to -- pound -- ; line 31, change "increases" to -- increase -- ; line 43, change "microwave" to -- microwaves -- ; line 68, change "issured" to -- issued -- .

In column 5, line 3, after "green" insert -- coffee -- ; line 6, change "bean" to -- beans -- ; line 61, change "microwave" to -- microwaves -- .

In column 7, line 31, change "inches" to -- inch -- .

UNITED STATES PATENT OFFICE
CERTIFICATE OF CORRECTION

Patent No. 3,989,849      Dated November 2, 1976

Inventor(s) Harvey P. Fogel et al.

It is certified that error appears in the above-identified patent and that said Letters Patent are hereby corrected as shown below:

In Claim 1, line 11, after "bean" insert -- causing expansion of the bean --; last line, before "roasted" insert -- correspondingly --.

Signed and Sealed this

Twenty-eighth Day of June 1977

[SEAL]

Attest:

RUTH C. MASON
*Attesting Officer*

C. MARSHALL DANN
*Commissioner of Patents and Trademarks*